Figure 1:
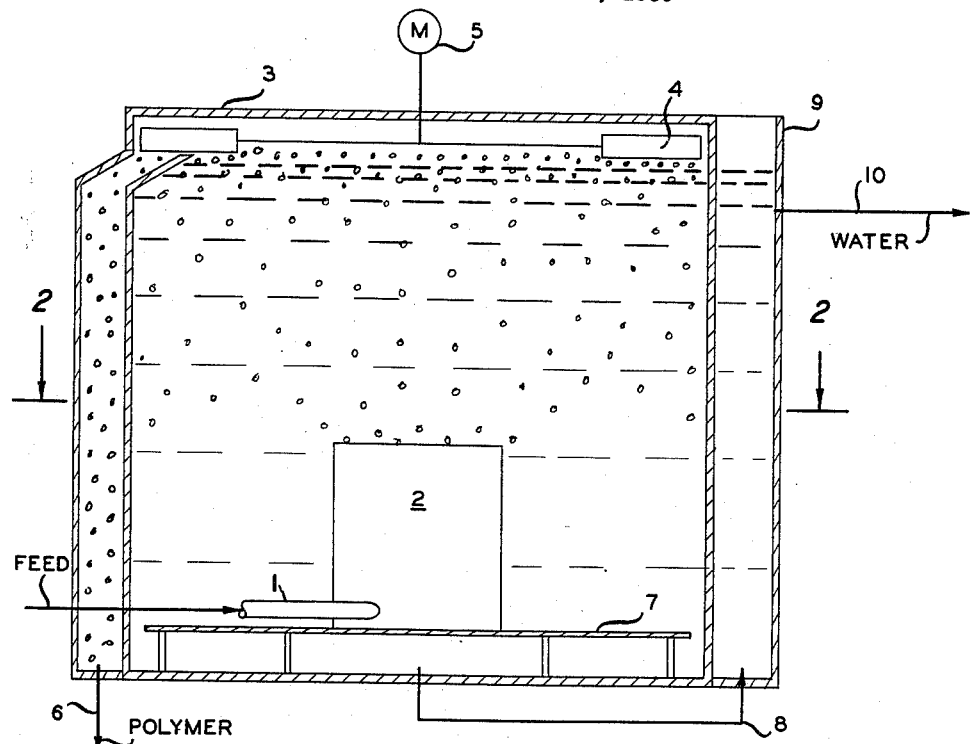
Figure 2:
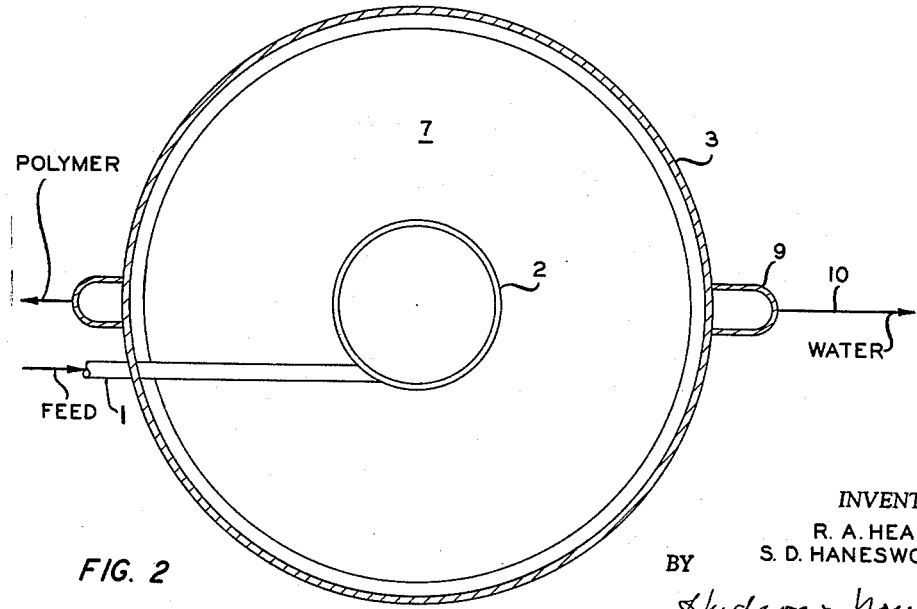

March 19, 1963

R. A. HEARNE ETAL 3,081,880

SKIMMING AND SKIMMER

Filed Dec. 23, 1959

INVENTOR.
R. A. HEARNE
S. D. HANESWORTH JR.
BY
Hudson & Young
ATTORNEYS

United States Patent Office 3,081,880
Patented Mar. 19, 1963

3,081,880
SKIMMING AND SKIMMER
Richard A. Hearne and Stanley D. Hanesworth, Jr., Pasadena, Tex., assignors to Phillips Petroleum Company, a corporation of Delaware
Filed Dec. 23, 1959, Ser. No. 861,709
1 Claim. (Cl. 210—525)

This invention relates to skimming. It also relates to a skimmer. In one of its aspects, the invention relates to skimming a solid from a liquid, the solid having a density lower than said liquid, for example, a polyolefin polymer from water, which comprises passing a slurry of polyolefin particles and water to a central lower section of a skimmer zone, causing slurry to overflow from said section into a peripheral section of said zone and to fill said zone, allowing solids to rise in said zone, skimming solids from the surface of liquid in said zone, removing liquid from said zone peripherally at the bottom thereof, passing said liquid into a liquid removal zone located below said skimmer zone, removing said liquid from said liquid removal zone from a central point thereof, passing removed liquid into a removed liquid accumulating zone positioned adjacent said skimmer zone, maintaining a level of removed liquid in said removed liquid zone thereby maintaining the level of liquid in said skimmer zone, and removing excess liquid over that required to maintain the liquid level from said removed liquid accumulating zone. In another of its aspects, the invention provides a skimmer apparatus which contains a skimmer adapted to skim the surface of liquid in the apparatus. The apparatus comprises, in the lower central portion of the skimmer, a section, in one embodiment, a cylindrical vessel open at the top thereof, into which a slurry of solids is discharged. The slurry of solids which is discharged into the lower central portion of the skimmer apparatus will overflow from the vessel. Solid which accumulates on the surface of the liquid in the skimmer will be skimmed and means are provided for drawing off skimmed solid from the skimmer apparatus. Below the vessel which is located in the lower central portion of the skimmer apparatus, there is provided a false bottom which does not extend all the way to the wall of the skimmer apparatus. Thus, an annulus is provided and liquid in the skimmer apparatus passes peripherally of the false bottom down and underneath the same. Means are provided for withdrawing liquid from underneath the false bottom. Liquid-accumulating means in open communication by way of the space below the false bottom with the liquid in the skimmer apparatus function to accumulate a level of liquid which controls the level of the liquid in the skimmer means, by hydrostatic level. Means are provided for removing excess liquid from said liquid-accumulating means.

In the separation of solvent from polymers in the preparation of polyolefins, prepared, for example, as described in Patent 2,825,721, J. P. Hogan and R. L. Banks, issued March 4, 1958, after the solvent has been steam stripped from the polymers, it is then necessary to separate most of the water from the polymers. This separation usually is accomplished in a vessel to which the water slurry of polymers is fed, water being removed from the bottom of the vessel and floating polymer being skimmed from the top thereof. Since the polymer skimmer vessel must be made of a material, stainless steel, which will not contaminate the polymers and the material is expensive, the vessel is made as small as practical. As the vessel is made smaller, it becomes increasingly difficult to remove most of the water from the bottom of the skimmer without also removing polymers which require a certain time to float to the top of the water in the skimmer. Obviously, any agitation of the layer of water from the top of which polymers are to be skimmed encourages polymer to tend to go out the bottom with desirably separated water.

We have now conceived of a skimmer and modus operandi wherein we provide a false bottom and a feed cylinder located above the false bottom but nevertheless below the surface level of the water in a skimmer to which cylinder water slurry of polymer is fed and from which cylinder the water slurry of polymer is fed into the skimmer, water, in effect, spilling over the top of the cylinder and working its way peripherally in the skimmer while the polyolefin continues to ascend to the surface of the level from which it can be skimmed. The false bottom which is provided does not extend all the way to the side wall of the skimmer and water continues its general path of travel downwardly at the periphery to a point under the false bottom from which it is withdrawn, the liquid in the skimmer is in hydrostatic communication with a provided removed water accumulator in which the level is adjusted, thereby adjusting the level of the water in the skimmer.

It is an object of this invention to provide a skimmer. It is a further object of this invention to skim a solid particulate material from the surface of a more dense liquid. It is a further object of this invention to provide for separation of a solid from a liquid in a rapid efficient manner while at the same time maintaining the apparatus small relative to that heretofore required.

Other aspects, objects and the several advantages of this invention will be apparent from a study of this disclosure, drawing and the appended claim.

According to this invention, there is provided an apparatus wherein there can be effected a method of skimming a solid particulate mass from a liquid on which it will float which comprises feeding a slurry of said particulate material and said liquid into the bottom of a centrally located feeding section located below the normal liquid level in a skimming zone but above a lower liquid remover zone located in the bottom of said skimming zone and communicating with said skimming zone at only a peripheral point thereof, continuing to flow slurry into the bottom of said section causing said slurry to overflow from the top of said section and eventually to form a liquid level above the top of said section in said skimming zone thus floating particulate material on the surface of liquid in said zone, skimming particulate material from the surface of the liquid in said zone as a product, peripherally removing from said zone by way of said liquid removal zone liquid in said zone, passing removed liquid into a removed liquid accumulating zone in open communication with said skimming zone and maintaining a level of liquid in said removed liquid accumulating zone to thereby maintain a desired liquid level in said skimming zone and removing excess removed liquid from said removed liquid accumulating zone. It will be understood by one skilled in the art that the "maintaining a level of liquid" in the removed liquid accumulation zone means limiting the rise of liquid in the skimming zone or tank above a predetermined point.

Thus, according to this invention, there is provided an apparatus comprising a skimming tank, a false bottom in said tank extending toward but not completely to the wall of said tank, a withdrawal conduit in the bottom of said tank below said false bottom, a skimmer at the top of said tank, a draw-off pipe in communication with the top of said tank for removing material skimmed from the level of liquid in said tank, means for accumulating liquid removed from below said false bottom in said tank, said last-mentioned means being in open communication with said tank and means for maintaining the liquid level in said removed liquid accumulating means whereby to maintain the liquid level in said tank.

In the drawing, FIGURE I is a vertical cross-section of a skimmer according to the invention. FIGURE II is a cross-sectional view taken along a plane II—II of FIGURE I.

Referring now to FIGURE I, a slurry of polyethylene polymer and water is passed into cylinder 2 from which it overflows into skimmer 3. As the liquid level builds up in skimmer 3, polymer tends to continue upwardly from cylinder 2 to be skimmed from the level of the liquid by skimmer rakes 4 driven by motor 5, polymer being taken off by way of pipe 6. Water is removed from skimmer 3 by passing it downwardly through the annulus formed between the wall of the skimmer and false bottom 7, the water being withdrawn by way of pipe 8 into removed water accumulator 9 in which the liquid level is maintained to maintain the liquid level in skimmer 3 by the removal of water by way of pipe 10 located at a desired level above the bottom of skimmer 3. At a rate of feeding and skimming a slurry equal to 300 gallons per minute of water, good results have been obtained, maintaining a level of 4 feet of water in the skimmer vessel employing a central feed cylinder 3 feet in diameter, a false bottom 3 inches from the wall and bottom of the tank.

It will be understood by one skilled in the art that the central feeding section and the false bottom or baffle 7 form an annular quiescent zone or section wherein particles which may be entrained in the liquid can rise.

The diameter of the tank was 12 feet.

Although in FIGURE II pipe 1 is shown in the preferred form of the invention wherein the slurry is fed tangentially into the bottom of cylinder 2, it is clear that the invention is operative to an extent to yield results by merely feeding the slurry into cylinder 2 without imparting thereto a rotation motion though, as indicated, a rotation motion is now preferred.

Reasonable variation and modification are possible within the scope of the foregoing disclosure, the drawing and the appended claims to the invention the essence of which is that there has been provided a means for skimming a solid particulate mass from the surface of a liquid on which it floats by feeding centrally above a false bottom a slurry to be separated and withdrawing from beneath said false bottom or baffle liquid separated from said slurry.

We claim:

An apparatus for separating a mass of particles from a liquid, the particles having a specific gravity lower than that of the liquid, comprising a skimming tank, a substantially horizontally disposed imperforate baffle adjacent and spaced from the bottom in said tank extending substantially over the bottom of said tank toward but not completely to the walls of said tank forming an annulus with said walls, a withdrawal conduit in the bottom of said tank below said baffle, a skimmer at the top of said tank for skimming said particles from the surface of said liquid, a draw-off means in communication with the top of said tank for removing said particles skimmed from the level of liquid in said tank, a centrally disposed feeding section open at its top and closed at its sides and bottom in said tank immediately above said baffle to form therewith an annular quiescent zone surrounding said central feeding section, means for feeding a slurry of solids and liquid into said centrally located section, said centrally located section permitting escape of slurry therefrom only by overflow into said skimming tank, said tank and said baffle providing means for accumulating liquid passing downwardly through said annulus, and means for removing the accumulated liquid from below said baffle, said last-mentioned means, including said withdrawal conduit, being in open communication with said tank, and means for limiting the liquid level in said tank above a predetermined point.

References Cited in the file of this patent

UNITED STATES PATENTS

| | | |
|---|---|---|
| 2,179,919 | Carr et al. | Nov. 14, 1939 |
| 2,390,841 | Longden | Dec. 11, 1945 |
| 2,539,019 | Hill | Jan. 23, 1951 |
| 2,576,645 | Shenk | Nov. 27, 1951 |
| 2,929,508 | Folz | Mar. 22, 1960 |